United States Patent
Darolia et al.

(10) Patent No.: US 6,190,471 B1
(45) Date of Patent: Feb. 20, 2001

(54) FABRICATION OF SUPERALLOY ARTICLES HAVING HAFNIUM-OR ZIRCONIUM-ENRICHED PROTECTIVE LAYER

(75) Inventors: Ramgopal Darolia, West Chester; William S. Walston, Maineville, both of OH (US)

(73) Assignee: General Electric Company, Cincinnati, OH (US)

( * ) Notice: Under 35 U.S.C. 154(b), the term of this patent shall be extended for 0 days.

(21) Appl. No.: 09/318,635

(22) Filed: May 26, 1999

(51) Int. Cl.⁷ ............................. C22F 1/00; C23C 4/00; C23C 10/00
(52) U.S. Cl. ..................... 148/537; 148/527; 428/680
(58) Field of Search .................... 148/527, 537; 428/680

(56) References Cited

U.S. PATENT DOCUMENTS

| | | | |
|---|---|---|---|
| Re. 31,339 | * 8/1983 | Dardi et al. | 428/678 |
| 4,152,223 | * 5/1979 | Wallace et al. | 204/37 R |
| 5,316,866 | * 5/1994 | Goldman et al. | 428/621 |
| 5,482,789 | 1/1996 | O'Hara et al. | 428/652 |
| 5,712,050 | * 1/1998 | Goldman et al. | 428/680 |
| 5,783,318 | * 7/1998 | Biondo et al. | 428/680 |
| 5,824,423 | 10/1998 | Maxwell et al. | 428/623 |
| 5,891,267 | * 4/1999 | Schaeffer et al. | 148/206 |

* cited by examiner

Primary Examiner—Daniel J. Jenkins
Assistant Examiner—Nicole Coy
(74) Attorney, Agent, or Firm—Andrew C. Hess; David L. Narciso

(57) ABSTRACT

A superalloy article has a protective layer thereon, either in the form of an environmental coating or a the bond coat for a thermal barrier coating system. The protective layer has a high content of hafnium and/or zirconium to improve the adherence and properties of the protective layer. To introduce the hafnium and/or zirconium into the protective layer, the nickel-base alloy substrate, to which the protective layer is applied, is prepared with an initially elevated content of the hafnium and/or zirconium. A conventional bond coat is applied to the substrate. In an interdiffusion treatment performed during coating and/or subsequently, hafnium and/or zirconium diffuses from the substrate into the bond coat.

18 Claims, 3 Drawing Sheets

FABRICATION OF SUPERALLOY ARTICLES HAVING HAFNIUM-OR ZIRCONIUM-ENRICHED PROTECTIVE LAYER

BACKGROUND OF THE INVENTION

This invention relates to protective layers on nickel-base superalloy articles, and, more particularly, to the fabrication of such articles where the protective layer has a high content of hafnium and/or zirconium.

In an aircraft gas turbine (et) engine, air is drawn into the front of the engine, compressed by a shaft-mounted compressor, and mixed with fuel. The mixture is combusted, and the resulting hot exhaust gases are passed through a turbine mounted on the same shaft. The flow of gas turns the turbine, which turns the shaft and provides power to the compressor. The hot exhaust gases flow from the back of the engine, driving it and the aircraft forwardly.

The hotter the exhaust gases, the more efficient is the operation of the jet engine. There is thus an incentive to raise the exhaust gas temperature. However, the maximum temperature of the exhaust gases is normally limited by the materials used to fabricate the turbine vanes and turbine blades of the turbine. In current engines, the turbine vanes and blades are made of nickel-based superalloys and can operate at temperatures of up to 1900–2100° F.

Many approaches have been used to increase the operating temperature limit and operating lives of the turbine blades and vanes. The compositions and processing of the materials themselves have been improved. The articles may be formed as oriented single crystals to take advantage of superior properties observed in certain crystallographic directions. Physical cooling techniques are used. In one widely used approach, internal cooling channels are provided within the components, and cool air is forced through the channels during engine operation.

In another approach, a protective layer or a ceramic/metal thermal barrier coating (TBC) system is applied to the turbine blade or turbine vane component, which acts as a substrate. The protective layer, with no overlying ceramic layer, is useful in intermediate-temperature applications. The currently known protective layers include diffusion aluminides and NiCoCrAlY(X) overlays, where X is typically hafnium, silicon, and/or tantalum.

A ceramic thermal barrier coating layer may be applied overlying the protective layer, to form a thermal barrier coating system. The thermal barrier coating system is useful in higher-temperature applications. The ceramic thermal barrier coating insulates the component from the exhaust gas, permitting the exhaust gas to be hotter than would otherwise be possible with the particular material and fabrication process of the substrate.

Although superalloys coated with such protective layers and ceramic/metal thermal barrier coating systems do provide substantially improved performance over uncoated materials, there remains an opportunity for improvement in elevated temperature performance and environmental resistance. It has recently been discovered that incorporating hafnium, silicon, yttrium, and/or zirconium in the protective environmental coating improves its environmental resistance and adherence to the substrate. However, available techniques for applying protective layers with additions of hafnium, silicon, yttrium, and/or zirconium have not proved to be sufficiently reproducible for adoption in commercial fabrication operations. There is a need for an improved approach to preparing substrates having protective layers containing hafnium and/or zirconium. The present invention fulfills this need, and further provides related advantages.

BRIEF SUMMARY OF THE INVENTION

The present invention provides a method for preparing a superalloy article with a protective layer thereon, wherein the protective layer has an elevated hafnium and/or zirconium content, and the articles made thereby. The approach retains excellent properties of the underlying substrate, while achieving the benefits of these protective-layer modifying elements. The approach is reliable and reproducible, and therefore suited for production operations.

In accordance with the invention, a method for preparing a superalloy article having a protective layer thereon comprises the steps of selecting a nominal nickel-base superalloy composition, and preparing a modified nominal nickel-base superalloy composition. The modified nominal nickel-base superalloy composition has an excess of a protective-layer modifying element over that of the nominal nickel-base superalloy composition, where the protective-layer modifying element is hafnium or zirconium. The protective-layer modifying element is preferably present in the modified nominal nickel-base superalloy composition in an amount of from about 0.2 to about 2.0 percent by weight, preferably about 1.0 percent by weight, for the case of hafnium, and/or in an amount of from about 0.1 to about 0.5 percent by weight, preferably about 0.25 percent by weight, for the case of zirconium, and combinations thereof. The method further includes processing the modified nominal nickel-base superalloy composition into a single crystal substrate having the shape of the article, and applying a protective layer to a surface of the substrate. The as-applied protective layer has a lower concentration of the protective-layer modifying element than the substrate. The protective layer modifying element is diffused from the substrate into the applied protective layer, providing an enhanced level of the protective layer modifying element in the protective layer.

The protective layer may be a diffusion aluminide or a NiCoCrAlY(X) overlay, or other type of layer that benefits from the presence of increased amounts of hafnium and/or zirconium. Optionally, a ceramic layer may be deposited overlying the enhanced protective layer to form a thermal barrier coating system.

In prior fabrication approaches, the hafnium, silicon, yttrium, or zirconium have been added to the material deposited on the surface of the substrate that forms the protective layer. These fabrication techniques have proved to be insufficiently reproducible and reliable. In the present approach, by contrast, hafnium and/or zirconium in an elevated amount is added to the substrate alloy, and then diffused outwardly into the protective layer. This permits the protective layer which need not have hafnium, silicon, yttrium, or zirconium as it is deposited, to be deposited by more conventional techniques that are reliable and reproducible. There is concern that the presence of the protective-layer modifying element in the substrate in excessive amounts may adversely affect its mechanical properties. For this reason, only hafnium and/or zirconium, and not silicon and/or yttrium, are added in extra amounts to the substrate alloy.

Further, the hafnium and/or zirconium are added to the substrate in a specific narrow compositional range such that the benefits of their increased levels in the protective layer are realized without adverse effects on the mechanical properties of the substrate. The protective-layer modifying element is preferably present in the modified nominal nickel-base superalloy composition in an amount of from about 0.2 to about 2.0 percent by weight, preferably about 1.0 percent by weight, for the case of hafnium; and/or in an amount of from about 0.1 to about 0.5 percent by weight, preferably about 0.25 percent by weight, for the case of zirconium. Combinations of hafnium and zirconium within these compositional ranges are operable.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 2A–B are schematic enlarged sectional views of the article of FIG. 1, taken on line 2—2, illustrating coating systems on the surface of the article, wherein FIG. 2A illustrates an environmental coating and FIG. 2B illustrates a thermal barrier coating system.

DETAILED DESCRIPTION OF THE INVENTION

Figure 1:
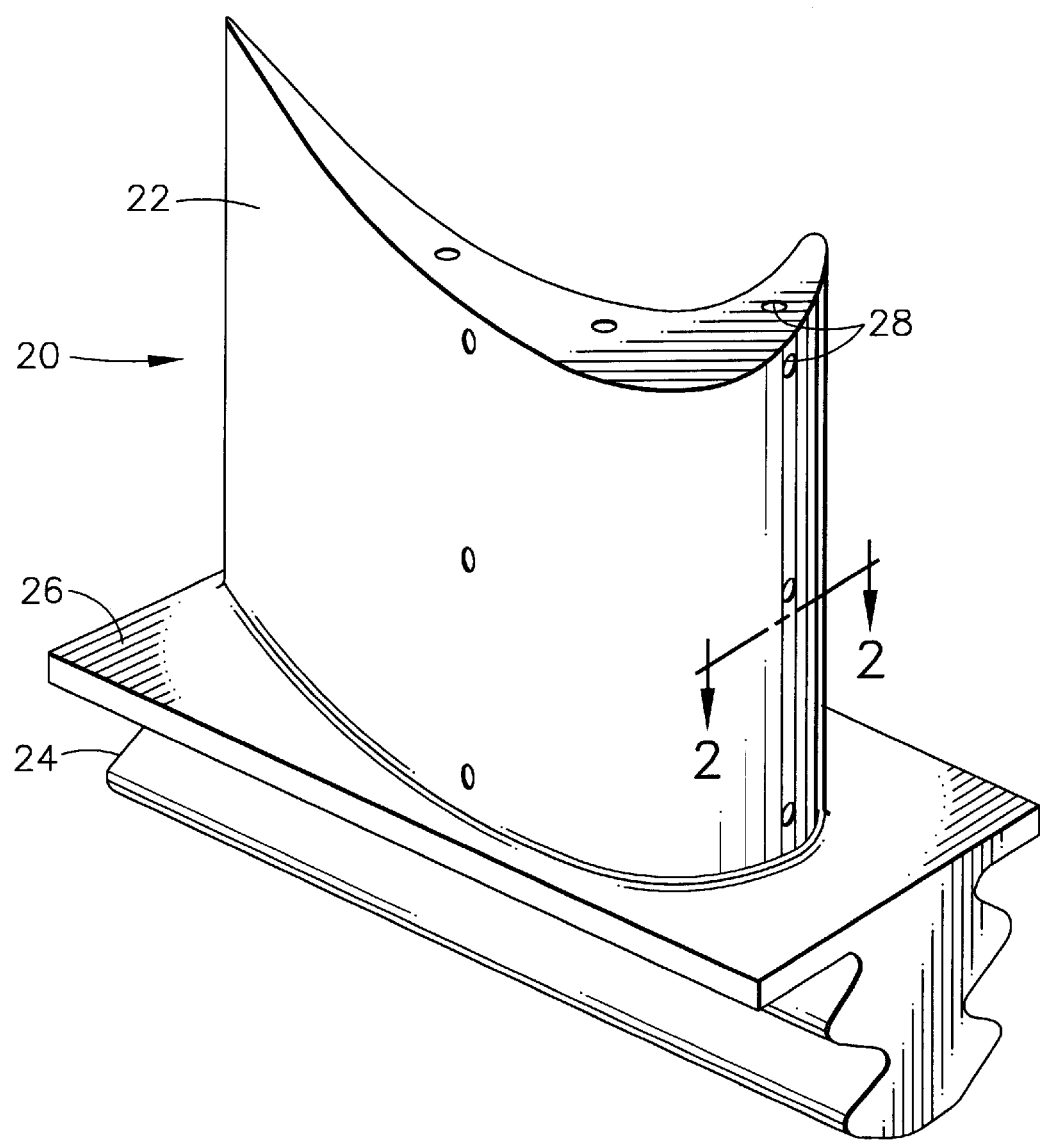
FIG. 1 is a perspective view of a turbine blade.

FIG. 1 depicts a component article of a gas turbine engine such as a turbine blade or turbine vane, and in this illustration a turbine blade 20. The turbine blade 20 includes an airfoil 22 against which the flow of hot exhaust gas is directed. (The turbine vane has a similar appearance in respect to the pertinent airfoil portion.) At least the airfoil 22, and preferably the entire turbine blade 20, is substantially single crystal. That is there are substantially no grain boundaries in the single crystal portion, and the crystallographic orientation is the same throughout. The term "substantially single crystal" means that virtually the entire article is a single crystal, although there may be some incidental small regions having other crystalline orientations present. Even a substantially single crystal article typically has a number of low-angle grain boundaries present, and these are permitted within the scope of the term "substantially single crystal".

The article must be substantially a single crystal (i.e., single grain). It may not be a polycrystal, either a random polycrystal or an oriented polycrystal such as produced by directional solidification. In the polycrystalline alloys, it has been conventional to add higher levels of elements that are known to strengthen grain boundaries, such as carbon, boron, hafnium, and zirconium. Zirconium and hafnium are chemically reactive, modify the morphologies of precipitate phases, and may adversely affect the heat treatment of the alloys. Because these elements are not needed to strength high-angle grain boundaries, which are not present in substantially single-crystal articles, it has therefore been the prior practice to omit them from single-crystal articles except in very minor amounts to strengthen the low-angle grain boundaries that may be present.

The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. In some articles, a number of cooling channels extend through the interior of the airfoil 22, ending in openings 28 in the surface of the airfoil 22. A flow of cooling air is directed through the cooling channels, to reduce the temperature of the airfoil 22.

Figure 2A:
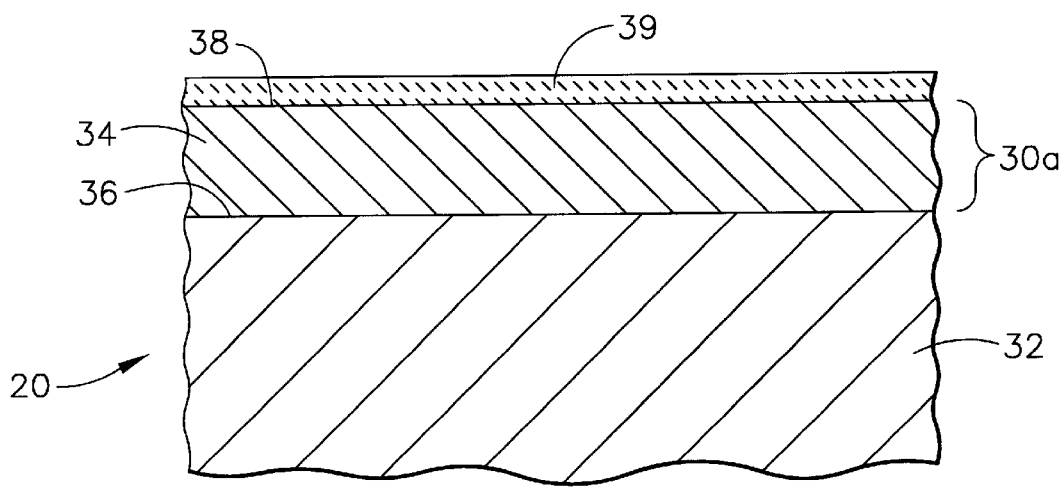
Figure 2B:
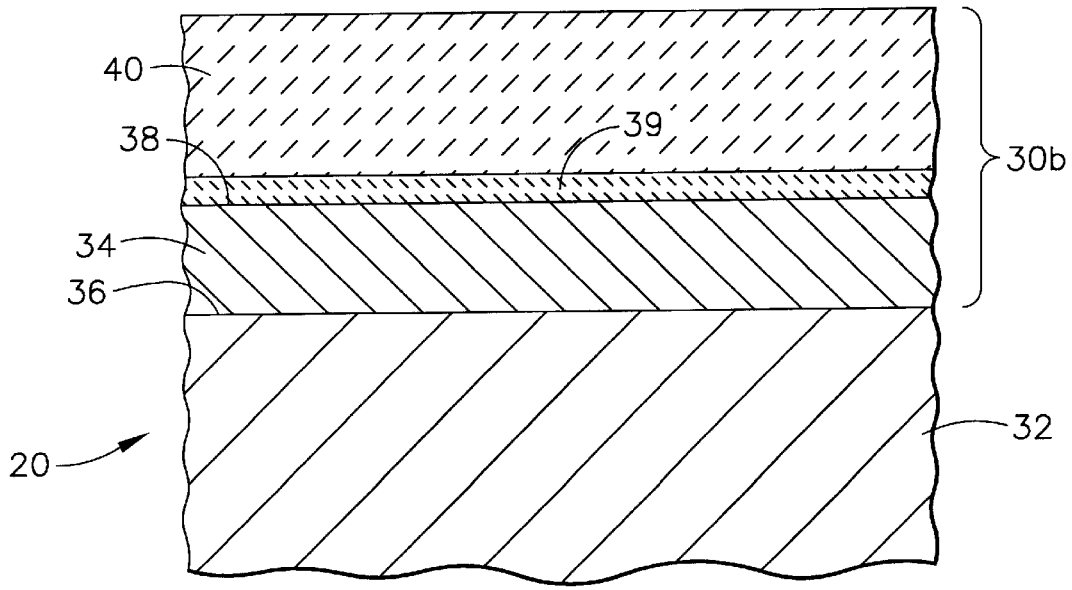

FIGS. 2A and 2B illustrate coating systems 30a and 30b deposited upon the turbine blade 20, which thereby serves as a substrate 32. The coating systems 30a and 30b include a protective layer 34 overlying and contacting a surface 36 of the turbine blade 20. In the coating system 30a of FIG. 2A, the protective layer 34 is sometimes termed an "environmental coating", and in the coating system 30b of FIG. 2B, the protective layer 34 is sometimes termed a "bond coat". In each case, the protective layer 34 is preferably from about 0.0005 to about 0.004 inches in thickness, but lesser or greater thicknesses are operable although less desirable. In each of the coating systems 30a and 30b, a topmost surface 38 of the protective layer 34 oxidizes during fabrication and/or during service to form a thin aluminum oxide layer 39. The term "protective layer" as used herein encompasses both environmental coatings (having no overlying ceramic thermal barrier coating, as in FIG. 2A) and bond coats (having an overlying ceramic thermal barrier coating 40, as in FIG. 2B).

The substrate 32 is formed of a modified nominal nickel-base superalloy composition. As used herein, "nickel-base" means that the composition has more nickel present than any other element. The preferred nominal nickel-base superalloys have a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 0.15 percent hafnium, balance nickel and incidental impurities.

A most preferred nominal nickel-base superalloy composition is Rene' N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities. Other operable superalloys include, for example, Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; CMSX-4, which has a nominal composition in weight percent of about 9.60 percent cobalt, about 6.6 percent chromium, about 0.60 percent molybdenum, about 6.4 percent tungsten, about 3.0 percent rhenium, about 6.5 percent tantalum, about 5.6 percent aluminum, about 1.0 percent titanium, about 0.10 percent hafnium, balance nickel and incidental impurities; CMSX-10, which has a nominal composition in weight percent of about 7.00 percent cobalt, about 2.65 percent chromium, about 0.60 percent molybdenum, about 6.40 percent tungsten, about 5.50 percent rhenium, about 7.5 percent tantalum, about 5.80 percent aluminum, about 0.80 percent titanium, about 0.06 percent hafnium, about 0.4 percent niobium, balance nickel and incidental impurities; PWA1480, which has a nominal composition in weight percent of about 5.00 percent cobalt, about 10.0 percent chromium, about 4.00 percent tungsten, about 12.0 percent tantalum, about 5.00 percent aluminum, about 1.5 percent titanium, balance nickel and incidental impurities;

PWA1484, which has a nominal composition in weight percent of about 10.00 percent cobalt, about 5.00 percent chromium, about 2.00 percent molybdenum, about 6.00 percent tungsten, about 3.00 percent rhenium, about 8.70 percent tantalum, about 5.60 percent aluminum, about 0.10 percent hafnium, balance nickel and incidental impurities; and MX-4, which has a nominal composition as set forth in U.S. Pat. No. 5,482,789, in weight percent, of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.05 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities. The use of the present invention is not limited to these alloys, and has broader applicability.

The nature of the modifications to the nominal nickel-base superalloys will be discussed more fully subsequently. However, for all of these compositions set forth in the preceding two paragraphs, where the protective-layer modifying element is hafnium, in the modified nominal nickel-base superalloy composition the hafnium content of the nominal nickel-base superalloy is replaced by the hafnium content in its specified range of from about 0.2 to about 2.0 percent by weight. Where the protective-layer modifying element is zirconium, in the modified nominal nickel-base superalloy composition the zirconium content is as stated within its specified range of from about 0.1 to about 0.5 percent by weight and the hafnium content is as indicated for the nominal nickel-base superalloy. Where the protective-layer modifying element is a combination of hafnium and zirconium, in the modified nominal nickel-base superalloy composition the hafnium content of the nominal nickel-base superalloy is replaced by the hafnium content in its specified range from about 0.2 to about 2.0 percent by weight and the zirconium content is as stated within its specified range of from about 0.1 to about 0.5 percent by weight.

The protective layer 34 may be of any operable type, but preferably is either a diffusion aluminide or a NiCoCrAlY(X) overlay. A diffusion aluminide is formed by depositing one or more sublayers overlying the surface 36, and then interdiffusing the deposited sublayers. For example, a sublayer containing platinum is first deposited upon the surface 36, and then a sublayer containing aluminum is deposited over the platinum sublayer at a temperature sufficient that the platinum and aluminum sublayers interdiffuse to form a platinum-aluminum coating layer. In a preferred embodiment, the platinum is present in an average amount of from about 20 to about 30 weight percent, preferably about 25 to about 28 weight percent, of the protective layer 34, and the aluminum is present in an average amount of from about 14 to about 25 weight percent, preferably from about 18 to about 22 weight percent, of the protective layer 34. In the NiCoCrAlY(X) overlay coating, a layer having the composition NiCoCrAlY(X), where X may be hafnium, silicon, and/or tantalum, is deposited on the surface 36. The NiCoCrAlY(X) overlay coating may have a composition in weight percent, for example, of 20 percent cobalt, 18 percent chromium, 12 percent aluminum, 0.3 percent yttrium, 0.5 percent hafnium, 0.5 percent silicon, balance nickel.

The ceramic thermal barrier coating layer 40, where present, is preferably from about 0.004 inches to about 0.030 inches thick, most preferably from about 0.005 to about 0.015 inches thick. (FIGS. 2A and 2B are not drawn to scale.) The ceramic thermal barrier coating layer 40 is operable in thicknesses outside this range, but is less desirable. Lesser thicknesses of the ceramic thermal barrier coating layer 40 tend to give insufficient insulation to the substrate 32. Greater thicknesses of the ceramic thermal barrier coating layer 40 tend to add unnecessary weight to the article. The ceramic thermal barrier coating layer 40 is preferably yttria-(partially) stabilized zirconia, which is a zirconium oxide-base ceramic material containing from about 4 to about 8 weight percent of yttrium oxide. Other operable stabilizing oxides and ceramic base materials may be used as well.

It is desirable to modify the composition of the protective layer 34 with controlled additions of one or more of the elements hafnium, zirconium, yttrium, and/or silicon. The presence of these elements in the protective layer 34 reduces the incidence of spallation failure within the protective layer 34 and/or the aluminum oxide layer 39, thereby prolonging the service life of the coating system 30.

However, experience has shown that it is difficult to incorporate these elements hafnium, zirconium, yttrium, and/or silicon, in the amounts required to be effective, into the protective layer 34 using conventional processing techniques for the diffusion aluminide or overlay coatings.

Figure 3:
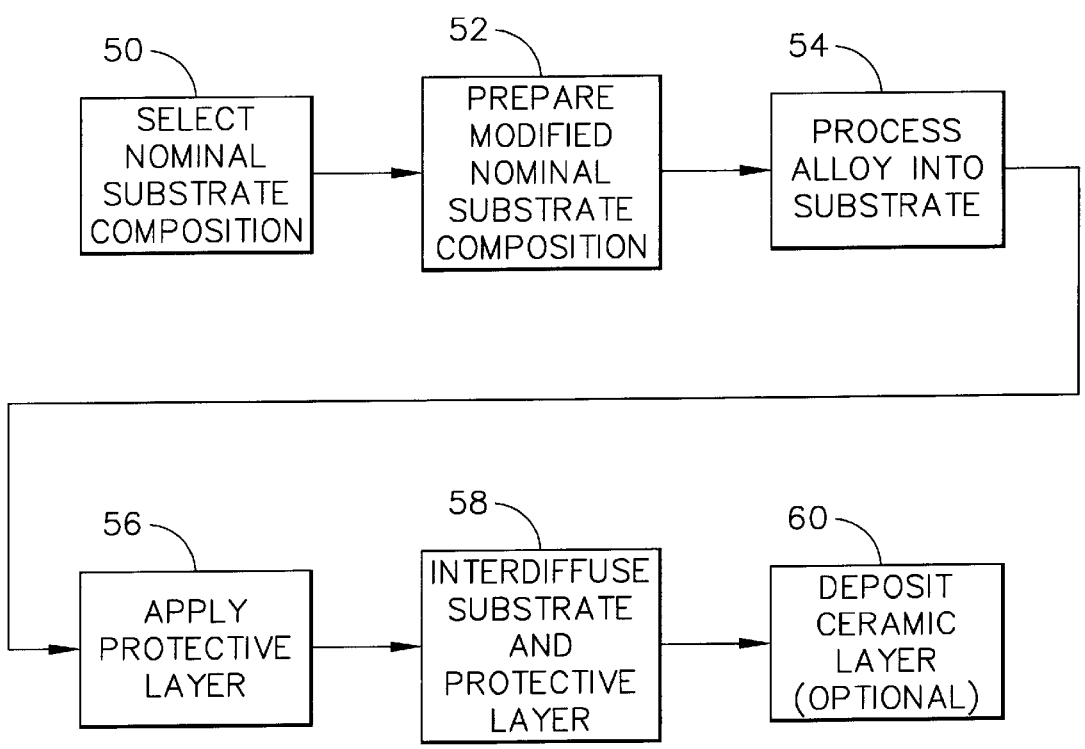
FIG. 3 is a block diagram of a preferred embodiment of the approach of the invention.

The present invention provides an alternative fabrication processing that permits a protective-layer modifying element to be incorporated into the protective coating in the amounts required to be effective in improving the properties of the protective layer 34. FIG. 3 depicts a preferred approach to practicing the present invention.

A nominal substrate composition is selected, numeral 50. This composition is selected as appropriate to the application, such as a nickel-base alloy appropriate to the preparation of a single crystal turbine blade or turbine vane. Examples of such nominal substrate compositions include Rene' N5. Rene' N6, CMSX-4, CMSX-10, PWA 1480, PWA 1484, and MX-4, whose compositions have been set forth previously.

A modified nominal nickel-base superalloy substrate composition is prepared, numeral 52. The modified nominal nickel-base superalloy substrate composition is the nominal nickel-base superalloy composition selected in step 50, modified by the addition of an excess of a protective-layer modifying element, above that which would otherwise be present in the nominal nickel-base superalloy substrate composition. The protective-layer modifying element is either hafnium or zirconium.

The hafnium or zirconium must be present in the modified nominal nickel-base superalloy composition in a concentration not less than (i.e., equal to or greater than) the concentration that is to be present in the final protective layer 34. However, the hafnium or zirconium may not be present in the modified nominal nickel-base superalloy composition in an amount that would have a substantial adverse effect on the mechanical and/or physical properties of the modified nominal nickel-base superalloy composition in its service application. For these reasons, only hafnium and zirconium have been determined to be candidates for the protective-layer modifying element. Other elements, such as silicon and yttrium, which may potentially improve the properties of the protective-layer must be added to the substrate composition in too great a concentration to be acceptable.

For example, the amount of silicon necessary to impart beneficial effects to the properties of the protective layer would require its concentration to be so large in the substrate composition that it would adversely affect the properties of the substrate material through increased long-term microstructural instability. The amount of yttrium necessary to impart beneficial effects to the properties of the protective layer would require its concentration to be so large in the substrate composition that it would cause excessive incipient melting during solution heat treat. Silicon and yttrium additions to the nominal nickel-base superalloy composition therefore do not come within the scope of the present invention.

The protective-layer modifying element is preferably present in the modified nominal nickel-base superalloy composition in an amount of from about 0.2 to about 2.0 percent by weight, preferably about 1.0 percent by weight, for the case of hafnium; and/or in an amount of from about 0.1 to about 0.5 percent by weight, preferably about 0.25 percent by weight, for the case of zirconium. If the amount of the addition is less than the indicated minimum in each case, there is an insubstantial advantageous effect on the properties of the protective-layer. If the amount of the addition is greater than the indicated maximum in each case, the mechanical and/or physical properties of the substrate are adversely affected. Other properties such as castability and heat treatability are also adversely affected if the amount of the addition is too great.

Thus, for example, a preferred modified Rene' N5 composition, in weight percent, is 7.5 percent cobalt, 7 percent chromium, 6.2 percent aluminum, 6.5 percent tantalum, 5 percent tungsten, 1.5 percent molybdenum, 3 percent rhenium, 0.05 percent carbon. 0.004 percent boron, up to 0.01 percent yttrium, about 1.0 percent hafnium, balance nickel and incidental impurities. In a variation of this preferred modified superalloy composition, the alloy is prepared with its conventional nominal hafnium content of about 0.15 weight percent, and about 0.25 percent zirconium is added. This amount of hafnium and/or zirconium in the superalloy composition does not substantially adversely affect the properties of the superalloy in service.

The modified nominal nickel-base substrate composition is processed into the desired shape of the substrate 32, numeral 54. The processing is desirably accomplished by casting, preferably by a casting process which produces a single crystal structure in the final article, such as the turbine blade 20.

The protective layer 34 is applied overlying the surface 36 of the substrate 32, numeral 56. The protective layer 34 is applied by any approach which is operable to produce the desired protective layer, and the selected approach depends upon the type of protective layer chosen. For the diffusion aluminide such as a platinum aluminide, the platinum layer may be electrodeposited and an overlying aluminum layer deposited by chemical vapor deposition or pack cementation. For the NiCoCrAlY(X) overlay coating, the coating may be deposited by low-pressure plasma spray (LPPS), air plasma spray (APS), high velocity oxyflame deposition (HVOF), or electron beam physical vapor deposition (EB-PVD). The protective layer 34 does not include so great an amount of the protective-layer modifying element that the conventional application procedure may not be used, and in most cases none of the protective-layer modifying element is present in the as-applied protective layer, except as may diffuse into the protective layer from the substrate.

The substrate 32 and the protective layer 34 are heated so that the protective-layer modifying element interdiffuses from the substrate 32 into the protective layer 34, numeral 58. The heating step 58 may be performed in part simultaneously with the application step 56, because the application step 56 is typically performed at elevated temperature. The heating step 58, with the resultant interdiffusion, may continue after the application step 56 is complete. The heating step 58 may also be performed simultaneously with subsequent processing steps that require heating to elevated temperature, and even during elevated-temperature service of the article. Preferably, the interdiffusion step 58 involves at least a heating to a temperature of from about 1900° F. to about 2000° F., for a time of at least about 2 hours.

The ceramic layer 40 is deposited, numeral 60, in those cases where the system is to serve as a thermal barrier coating system. The ceramic coating 40 may be deposited by any operable technique, with electron beam physical vapor deposition (EB-PVD) being preferred for the preferred yttria-stabilized zirconia coating. The EB-PVD processing may be preceded and/or followed by high-temperature processes that may affect the distribution of elements in the bond coat. The EB-PVD process itself is typically conducted at elevated temperatures.

During the interdiffusion processing, the protective-layer modifying element diffuses from the substrate 32 outwardly into the protective layer 34. These elements alloy with the as-deposited protective layer 34 to form the modified composition, which is more highly resistant to failure in service than the unmodified composition.

Test specimens were prepared of the Rene N5 nominal composition as set forth above, and six compositions having the Rene N5 nominal composition plus 0.64 weight percent hafnium, 1.06 weight percent hafnium. 1.33 weight percent hafnium, 0.2 weight percent zirconium, 0.5 weight percent zirconium, or 0.75 weight percent zirconium. All of these alloys were easily made into single crystal slabs without any reaction with the mold materials, an important consideration for production operations. The compositions were heat treated at a temperature of 2200–2400° F. for up to 16 hours, and specimens were prepared of some of the composition for the evaluation of thermal barrier coating performance. (No testing was performed for the 0.5 weight percent zirconium and 0.75 weight percent zirconium compositions.)

To evaluate thermal barrier coating performance, multiple 1 inch diameter by ⅛ inch thick disk specimens were first coated with a platinum aluminide bond coat and then a ceramic top coat as discussed earlier. The test procedure was a furnace cycling test in which the specimen was heated from room temperature to 2125° F., maintained at 2125° F. for 50 minutes, and cooled to room temperature, each total cycle lasting 60 minutes. Failure was defined as spalling away of 20 percent of the coating area. The results are as follows, in the average number of cycles to failure taken over the indicated number of specimens:

| Specimen Identification | Avg. Cycles to Failure | No. of Specimens |
|---|---|---|
| Rene N5 | 228 | 40 |
| Rene N5 + 0.64 percent hafnium | 340 | 6 |
| Rene N5 + 1.06 percent hafnium | 397 | 6 |
| Rene N5 + 1.33 percent hafnium | 480 | 6 |
| Rene N5 + 0.2 percent zirconium | 330 | 6 |

The approach of the invention yields a substantial improvement in the thermal barrier coating performance as measured by the furnace cycling test.

Specimens were also prepared of some of the composition for the evaluation of mechanical properties in stress rupture testing. (No testing was performed for the 0.5 weight percent zirconium and 0.75 weight percent zirconium compositions.) In a first test protocol, specimens were tested at 1800° F. and 30,000 pounds per square inch stress. In a second test protocol, specimens were tested at 2000° F. and 16,000 pounds per square inch stress. The number of hours to failure for each test protocol is set forth in the following table, with each data entry being the average of four tests.

| Specimen Identification | First protocol, hours | Second protocol, hours |
|---|---|---|
| Rene N5 | 300 | 400 |
| Rene N5 + 0.64 percent hafnium | 342 | 771 |
| Rene N5 + 1.06 percent hafnium | 329 | 454 |
| Rene N5 + 1.33 percent hafnium | 294 | 236 |
| Rene N5 + 0.2 percent zirconium | 348 | 504 |

From this data and other information, the limitations on the hafnium and zirconium contents as set forth above were established.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for preparing a single-crystal superalloy article having a protective layer thereon, comprising the steps of
    selecting a nickel-base superalloy composition;
    preparing a modified version of said nickel-base superalloy composition, wherein the modified version of said nickel-base superalloy composition has an excess of a protective-layer modifying element over that of the nickel-base superalloy composition, the protective-layer modifying element being selected from the group consisting of
        from about 0.2 to about 2.0 percent by weight hafnium, and
        from about 0.1 to about 0.5 percent by weight zirconium, and combinations thereof;
    processing the modified version of said nickel-base superalloy composition into a substrate having the shape of the article and being substantially a single crystal;
    applying a protective layer to a surface of the substrate, the as-applied protective layer having a lower concentration of the protective-layer modifying element than the substrate; and
    interdiffusing the protective layer modifying element from the substrate into the applied protective layer.

2. The method of claim 1, including an additional step, after the step of applying a protective layer, of depositing a ceramic layer overlying the protective layer.

3. The method of claim 1, wherein the protective-layer modifying element is hafnium.

4. The method of claim 1, wherein the protective-layer modifying element is zirconium.

5. The method of claim 1, wherein the protective-layer modifying element is a combination of hafnium and zirconium.

6. The method of claim 1, wherein the nickel-base superalloy has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 0.15 percent hafnium, balance nickel and incidental impurities.

7. The method of claim 1, wherein the nickel-base superalloy has a composition, in weight percent, selected from the group consisting of
    a composition of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities;
    a composition of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities;
    a composition of about 9.6 percent cobalt, about 6.6 percent chromium, about 0.60 percent molybdenum, about 6.4 percent tungsten, about 3.0 percent rhenium, about 6.5 percent tantalum, about 5.6 percent aluminum, about 1.0 percent titanium, about 0.10 percent hafnium, balance nickel and incidental impurities;
    a composition of about 7.00 percent cobalt, about 2.65 percent chromium, about 0.60 percent molybdenum, about 6.40 percent tungsten, about 5.50 percent rhenium, about 7.5 percent tantalum, about 5.80 percent aluminum, about 0.80 percent titanium, about 0.06 percent hafnium, about 0.4 percent niobium, balance nickel and incidental impurities;
    a composition of about 5.00 percent cobalt, about 10.0 percent chromium, about 4.00 percent tungsten, about 12.0 percent tantalum, about 5.00 percent aluminum, about 1.5 percent titanium, balance nickel and incidental impurities;
    a composition of about 10.00 percent cobalt, about 5.00 percent chromium, about 2.00 percent molybdenum, about 6.00 percent tungsten, about 3.00 percent rhenium, about 8.70 percent tantalum, about 5.60 percent aluminum, about 0.10 percent hafnium, balance nickel and incidental impurities;
    a composition of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.05 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities.

8. The method of claim 1, wherein the modified version of said nickel-base superalloy has a composition, in weight percent, of from about 0.2 to about 2.0 percent by weight hafnium, about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, up to about 0.01 percent yttrium, balance nickel and incidental impurities.

9. The method of claim 1, wherein the modified version of said nickel-base superalloy has a composition, in weight percent, of from about 0.1 to about 0.5 percent by weight zirconium, about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities.

10. The method of claim 1, wherein the modified version of said nickel-base superalloy has a composition, in weight percent, of from about 0.2 to about 2.0 percent by weight hafnium, from about 0.1 to about 0.5 percent by weight zirconium, about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, up to about 0.01 percent yttrium, balance nickel and incidental impurities.

11. The mood of claim 1, wherein the modified version of said nickel-base superalloy has a composition, in weight percent, of from about 0.2 to about 2.0 percent by weight hafnium, about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.05 percent carbon, about 0.004 percent boron, about 0.01 percent yttrium, balance nickel and incidental impurities.

12. The method of claim 1, wherein the modified version of said nickel-base superalloy has a composition, in weight percent, of from about 0.1 to about 0.5 percent by weight zirconium, about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities.

13. The method of claim 1, wherein the modified version of said nickel-base superalloy has a composition, in weight percent, of from about 0.2 to about 2.0 percent by weight hafnium, from about 0.1 to about 0.5 percent by weight zirconium, about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.05 percent carbon, about 0.004 percent boron, about 0.01 percent yttrium, balance nickel and incidental impurities.

14. The method of claim 1, wherein the step of processing includes the step of
directionally solidifying the modified version of said nickel-base superalloy composition.

15. The method of claim 1, wherein the protective layer is a diffusion aluminide.

16. The method of claim 1, wherein the protective layer is a NiCoCrAlY(X) overlay, wherein X is selected from the group consisting of hafnium, silicon, and tantalum.

17. The method of claim 1, wherein the substrate has a shape selected from the group consisting of a turbine blade and a turbine vane.

18. A method for preparing a single-crystal superalloy article having a protective layer thereon, comprising the steps of
selecting a nickel-base superalloy composition;
preparing a modified version of said nickel-base superalloy composition, wherein the modified version of said nickel-base superalloy composition has an excess of a protective-layer modifying element over that of the nickel-base superalloy composition, the protective-layer modifying element being selected from the group consisting of
from about 0.2 to about 2.0 percent by weight hafnium, and
from about 0.1 to about 0.5 percent by weight zirconium, and combinations thereof;
processing the modified version of said nickel-base superalloy composition into a substantially single-crystal substrate having the shape of an article selected from the group consisting of a turbine blade and a turbine vane;
applying a protective layer to a surface of the substrate, the as-applied protective layer having a lower concentration of the protective-layer modifying element than the substrate;
interdiffusing the protective layer modifying element from the substrate into the applied protective layer; and
depositing a ceramic layer overlying the protective layer.

* * * * *